(12) United States Patent
Shang (10) Patent No.: US 10,324,811 B2
(45) Date of Patent: Jun. 18, 2019

(54) OPPORTUNISTIC FAILOVER IN A HIGH AVAILABILITY CLUSTER (71) Applicant: VMware, Inc., Palo Alto, CA (US)

(72) Inventor: Jingliang Shang, Beijing (CN)

(73) Assignee: VMware, Inc, Palo Alto, CA (US)

(*) Notice: Subject to any disclaimer, the term of this patent is extended or adjusted under 35 U.S.C. 154(b) by 213 days.

(21) Appl. No.: 15/590,929

(22) Filed: May 9, 2017

(65) Prior Publication Data
US 2018/0329789 A1 Nov. 15, 2018

(51) Int. Cl.
G06F 11/00 (2006.01)
G06F 11/20 (2006.01)
H04L 29/08 (2006.01)

(52) U.S. Cl.
CPC ........ G06F 11/203 (2013.01); H04L 67/1097 (2013.01); G06F 2201/805 (2013.01); G06F 2201/825 (2013.01)

(58) Field of Classification Search
CPC ............. G06F 11/203; G06F 2201/805; G06F 2201/825; H04L 67/1097
USPC ........................................................ 714/4.11
See application file for complete search history.

(56) References Cited

U.S. PATENT DOCUMENTS

| | | | |
|---|---|---|---|
| 2007/0094659 A1* | 4/2007 | Singh .................. | G06F 9/45533 718/1 |
| 2009/0222558 A1* | 9/2009 | Xu .......................... | G06F 9/485 709/224 |
| 2014/0244876 A1* | 8/2014 | Colpo ..................... | G06F 21/70 710/200 |
| 2015/0067284 A1* | 3/2015 | Antony .................. | G06F 3/065 711/162 |
| 2015/0205542 A1* | 7/2015 | Antony ............... | G06F 9/45558 711/162 |
| 2018/0095855 A1* | 4/2018 | Sanakkayala ....... | G06F 9/45558 |

* cited by examiner

Primary Examiner — Jason B Bryan (57) ABSTRACT

Failover processing of a service in a cluster of nodes is disclosed. A node brings up a failover instance of a service in response to an indication of a failure in an initial instance of the service. The failover service executes in the background so as not to be visible to users and thus does not receive user requests. The background service is terminated in response to the failure indication being a false positive. The background service is executed in the foreground in response to detecting that the initial instance of the service has failed and processes user requests.

20 Claims, 5 Drawing Sheets

OPPORTUNISTIC FAILOVER IN A HIGH AVAILABILITY CLUSTER

BACKGROUND

Modern high availability cluster servers rely on built-in locking mechanisms that are typically present in distributed systems such as cluster file systems, distributed file systems, network file systems, and so on. The locking mechanism is typically lease based, so as to deal with possible server crashes. When a service is running or executing on a server (node), the service holds an exclusive lock on resources (e.g., data files) used by that service. For example, an SQL service running or executing on a Microsoft Windows® server may hold locks on one or more SQL database files. A virtual machine (VM) running on a VMware ESXi® server (host machine) may hold a lock on a VM virtual disk file, and so on. To keep this exclusive lock on the resources, the operating system (OS) kernel on the server sends regular heartbeats to the storage (file) server that contains the resources.

If an instance of a service running or executing on a node in the cluster, or the node itself, dies or otherwise fails, the lock should expire after some time. The storage server allows another node in the cluster to break the lock after the current lock holder fails to renew the lock. The storage server typically provides a grace period, allowing for the possibility that the service has not in fact failed but rather has experienced a delay that it can recover from. Accordingly, the storage server may allow for several missed heartbeats before releasing the lock. Failover to another instance of the service (e.g., on a failover node) can only be initiated after this grace period has passed, since the failover node will not be able to acquire a lock on the resources for the failover service prior to that time.

The grace period differs among systems. In some systems, for instance, the grace period is 35-45 seconds in duration; e.g., three heartbeats with ten seconds between heartbeats and a graceful wait time of about 15 seconds after that for good measure. In other systems, the time is about 15-20 second, at three heartbeats with five seconds between beats and a graceful wait time, and so on. While this delay can seem to be a short amount of time, a 45-second delay can be unacceptable in a high-availability system when access times are typically measured in tens to hundreds of milliseconds.

As slow as the delay may be, the delay is nonetheless important in order to reduce the likelihood of a false positive indication of a failure. For example, the cluster can include a cluster server that monitors each of the services and/or nodes in the cluster to determine whether a service is alive (up and running) or not. If the cluster server determines that the initial instance of a service is no longer alive (indication of a failure) then it can initiate failover processing to bring up failover instance of the service. If the indication is a false positive (false alarm) because the initial instance of the service is actually alive, the service will still have a lock on its resources which will prevent those resources from being opened and modified by the failover service, thus maintaining data consistency of the resources.

On the other hand, if the initial instance of the service is in fact no longer alive, then the failover service will incur a delay equal to the grace period before the storage system will release the lock and grant a lease to the failover service. The delay is further increased due to the startup time of the failover service before it can start servicing requests from the user.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

The present disclosure describes a technique referred to herein as opportunistic failover. In response to an indication of a failure of an initial instance of service or the node on which the service is running, failover processing in accordance with the present disclosure speeds up computer processing by bringing up a failover instance of the service, while concurrently assessing whether or not the indication is a false positive (i.e., the service is actually alive). If the initial instance of the service in fact failed, then by the time that determination is made (e.g., by acquiring a lock on the service), the failover instance of the service will be well on its way to being up and running, if not already so, thus speeding up computer processing in terms of bringing up the failover service.

Further in accordance with the present disclosure, failover processing in accordance with the present disclosure can improve computer performance by freeing up computing resources (e.g., main memory, processor time) used to bring up the failover service, sooner rather than later, in the case of a false positive. For example, if the initial instance of the service in fact did not fail, then the service will access (e.g., read, write) its resources at some point. Accordingly, the present disclosure includes monitoring for an access operation on those resources, which can occur sooner than waiting for a timeout to occur trying to acquire a lock on the resources. This allows for a quicker determination of a false positive indication so that the computer resources used to bring up the failover service can be freed up as soon as possible, allowing those resources to be used by other processes in the computer, thus improving computer performance.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
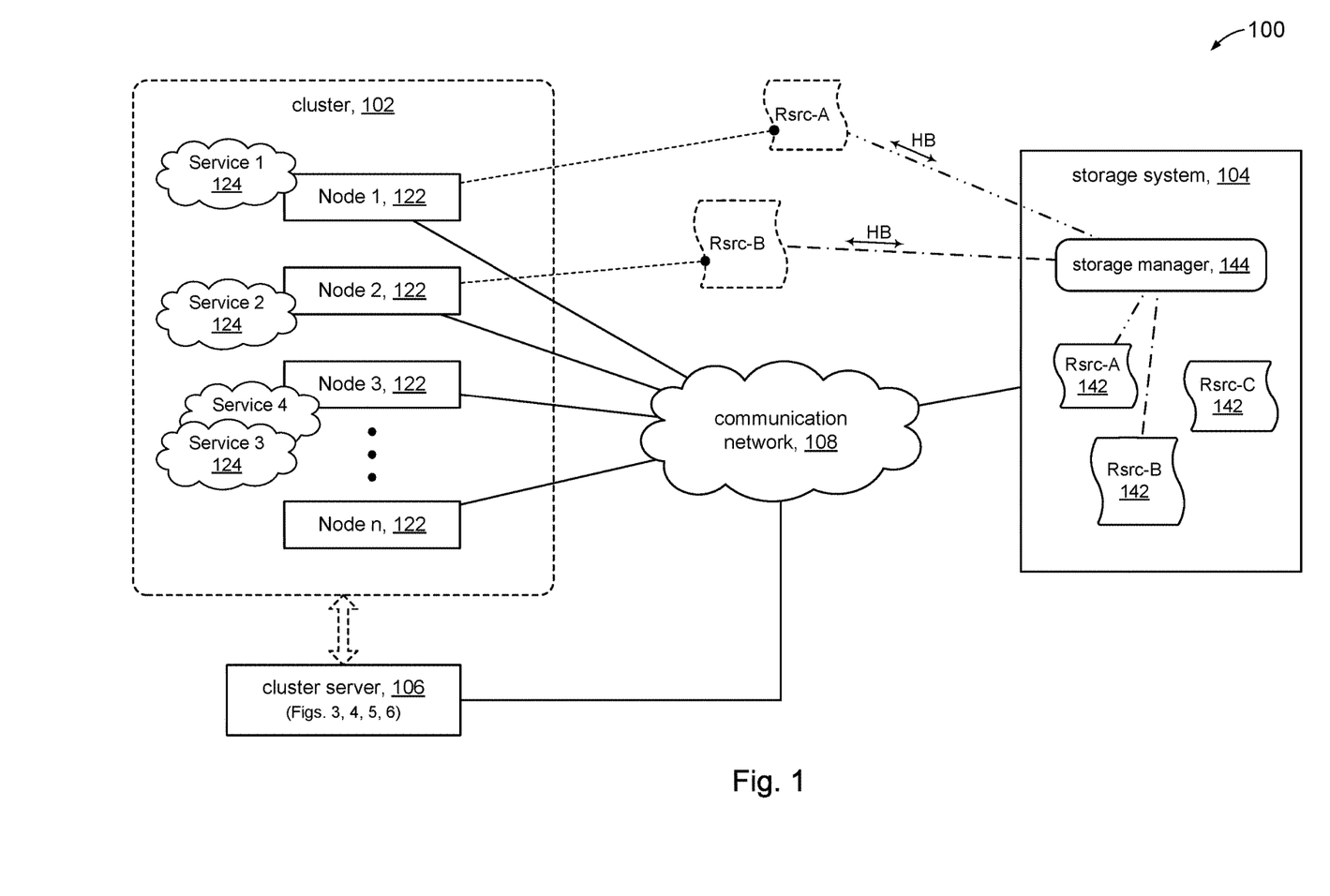
FIG. 1 is a simplified representation of a cluster in accordance with the present disclosure.

FIG. 1 is a simplified representation of a system 100 comprising a cluster 102 of two or more computer nodes (servers) 122 configured to work together to provide high availability of services 124 for clients. The figure shows, for example, a service 124 (Service 1) instantiated on Node 1, and another service 124 (Service 2) instantiated on Node 2. One or more services 124 may execute on a node 122; e.g., Service 3 and Service 4 execute on Node 3.

A service 124 is associated with one or more resources (e.g., one or more data files used by the service). The resources for a database service, for example, can comprise one or more data files that constitute the database. In a virtual machine server, the resources can include a virtual machine disk data file that stores the contents of a virtual hard disk for a virtual machine that is instantiated on the virtual machine server, and so on.

The system 100 can include a storage system 104. In various embodiments, storage system 104 can include any suitable configuration of storage devices (not shown) for storing data files. The storage system 104 can store resources 142 for services 124 instantiated on the nodes 122 in cluster 102.

The storage system 104 can include a storage manager 144 to manage resources 142 used by services 124. In particular, the storage manager 144 can use the known technique of exclusive locking of the resources 142 to facilitate data consistency. Locking can be used to restrict access to a set of resources 142 for a service 124 by limiting access to only the node 122 that acquired a lock on those resources 142. When a service 124 is brought up on a node 122, the service 124 can obtain a lock on its resources 142. FIG. 1, for example, shows that Service 1 uses Rsrc-A and so has acquired a lock on that resource. Likewise, Service 2 uses resource Rsrc-B and thus has a lock on Rsrc-B. A service 124 can interact with the storage manager 144 to obtain a lock on its resources 142 as part of the process of bringing up that service on a given node 122. The storage manager 144 can use the known technique of heartbeats (HB) with the service 124 to renew the lease on the lock of its respective resources 142.

The system 100 can include a cluster server 106 to monitor nodes 122 for an indication of a possible failure of a service 124 and perform failover processing in accordance with the present disclosure. When a failure in an instance of a service 124 is indicated, the cluster server 106 can initiate a failover process to redirect its resources 142 to another instance of the service 124 another node 122.

In some embodiments, the monitoring and failover processing performed by cluster server 106 can be performed by each node 122 in the cluster 102, and thus the cluster server 106 can be omitted in such embodiments. In such a configuration, when a node 122 (e.g., Node 1) determines that another node (e.g., Node 2) may have crashed, Node 1 can perform failover processing in accordance with the present disclosure.

The system 100 can include a communication network 108 to provide communication between the nodes 122 in cluster 102, the storage system 104, and the cluster server 106. The communication network 108 can be any type of computer network or a combination of networks that allows communications between devices connected to the network. The communication network 108 may include the Internet, a wide area network (WAN), a local area network (LAN), a storage area network (SAN), a fibre channel network and/or other networks. The communication network 108 may be configured to support protocols suited for communications with storage arrays, such as Fibre Channel, Internet Small Computer System Interface (iSCSI), Fibre Channel over Ethernet (FCoE) and HyperSCSI.

Figure 2:
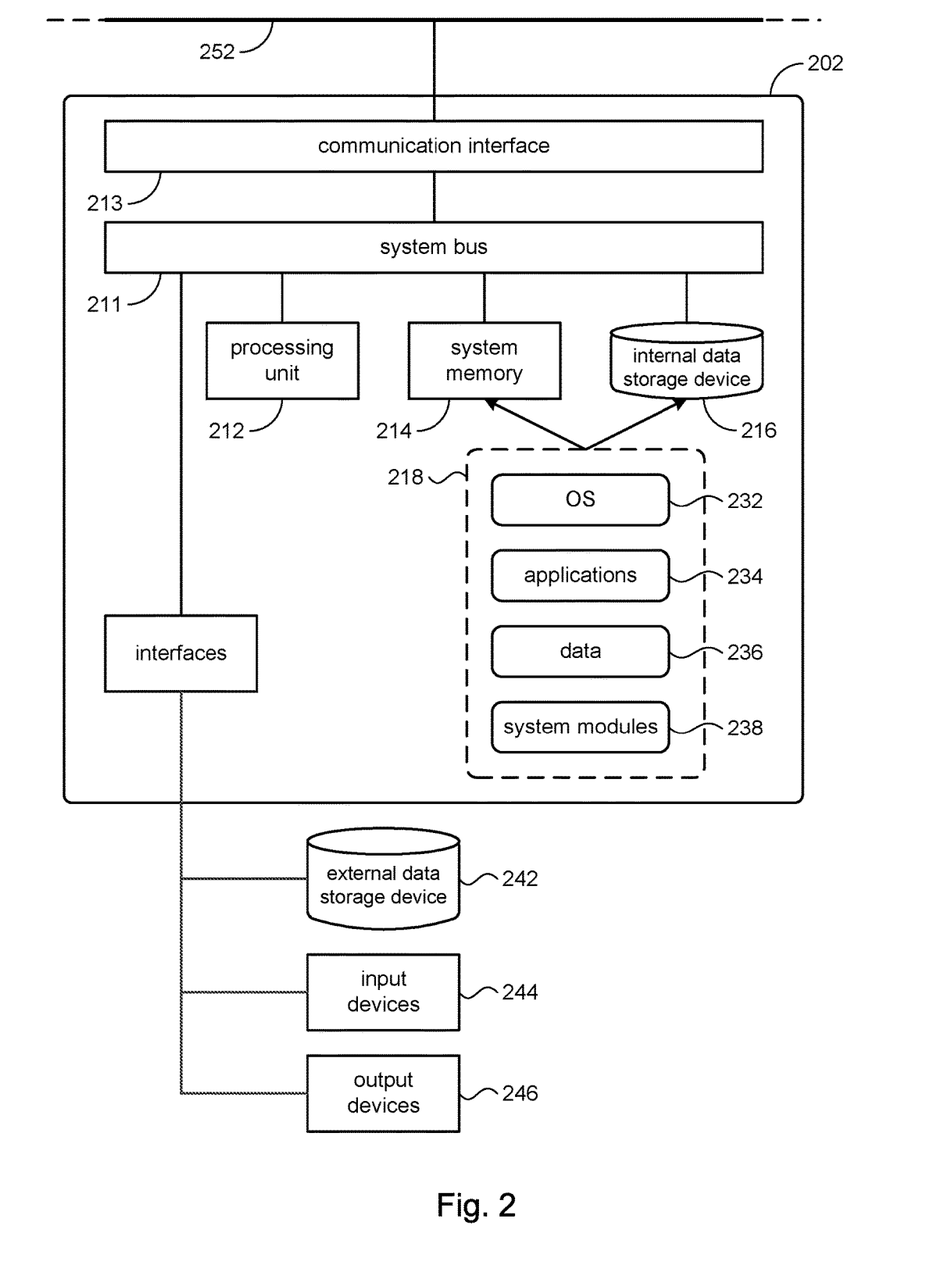
FIG. 2 is a simplified representation of an illustrative implementation of a computing device in accordance with the present disclosure.

Referring to FIG. 2, an illustrative implementation of each node 122 or cluster server 106 can include a computing device 202 having a processing unit 212, a system memory 214, and a system bus 211. The system bus 211 can connect various system components including, but not limited to, the processing unit 212, the system memory 214, an internal data storage device 216, and a communication interface 213.

The processing unit 212 can include a single-processor configuration, or can be a multi-processor architecture. The system memory 214 can include read-only memory (ROM) and random access memory (RAM). The internal data storage device 216 can be an internal hard disk drive (HDD), a magnetic floppy disk drive (FDD) to read from or write to a removable diskette, an optical disk drive (e.g., for reading a CD-ROM disk, or to read from or write to other high capacity optical media such as the DVD, and so on).

The internal data storage device 216 can comprise non-transitory computer-readable storage media to provide non-volatile storage of data, data structures, computer-executable instructions, and so forth. Although the description of computer-readable media above refers to media such as an HDD, a removable magnetic diskette, and a removable optical media, it is noted that other types of media which are readable by a computer, such as zip drives, magnetic cassettes, flash memory cards, cartridges, and the like, can also be used, and further, that any such media can contain computer-executable instructions for performing the methods disclosed herein.

The system memory 214 and/or the internal data storage device 216 can store various program and data modules 218, including for example, operating system 232, one or more application programs 234, program data 236, and other program/system modules 238. For example, in a computing device 202 configured as a node 122, the application programs 234, which when executed, can cause the computing device 202 to provide a service 124. In a computing device 202 configured as cluster server 106, the application programs 234, which when executed, can cause the computing device 202 to perform operations relating to failover processing disclosed herein.

An external data storage device 242 can be connected to the computing device 202. For example, the external data storage device 242 can be the storage system 104.

Access to the computing device 202 can be provided by a suitable input device 244 (e.g., keyboard, mouse, touch pad, etc.) and a suitable output device 246, (e.g., display screen). In a configuration where the computing device 202 is a mobile device, input and output can be provided by a touch sensitive display.

The computing device 202 can operate in a networked environment using logical connections via wired and/or wireless communications to one or more remote computers (not shown) over a communication network 252. The communication network 252 can be a local area network (LAN) and/or larger networks, such as a wide area network (WAN).

Figure 3:
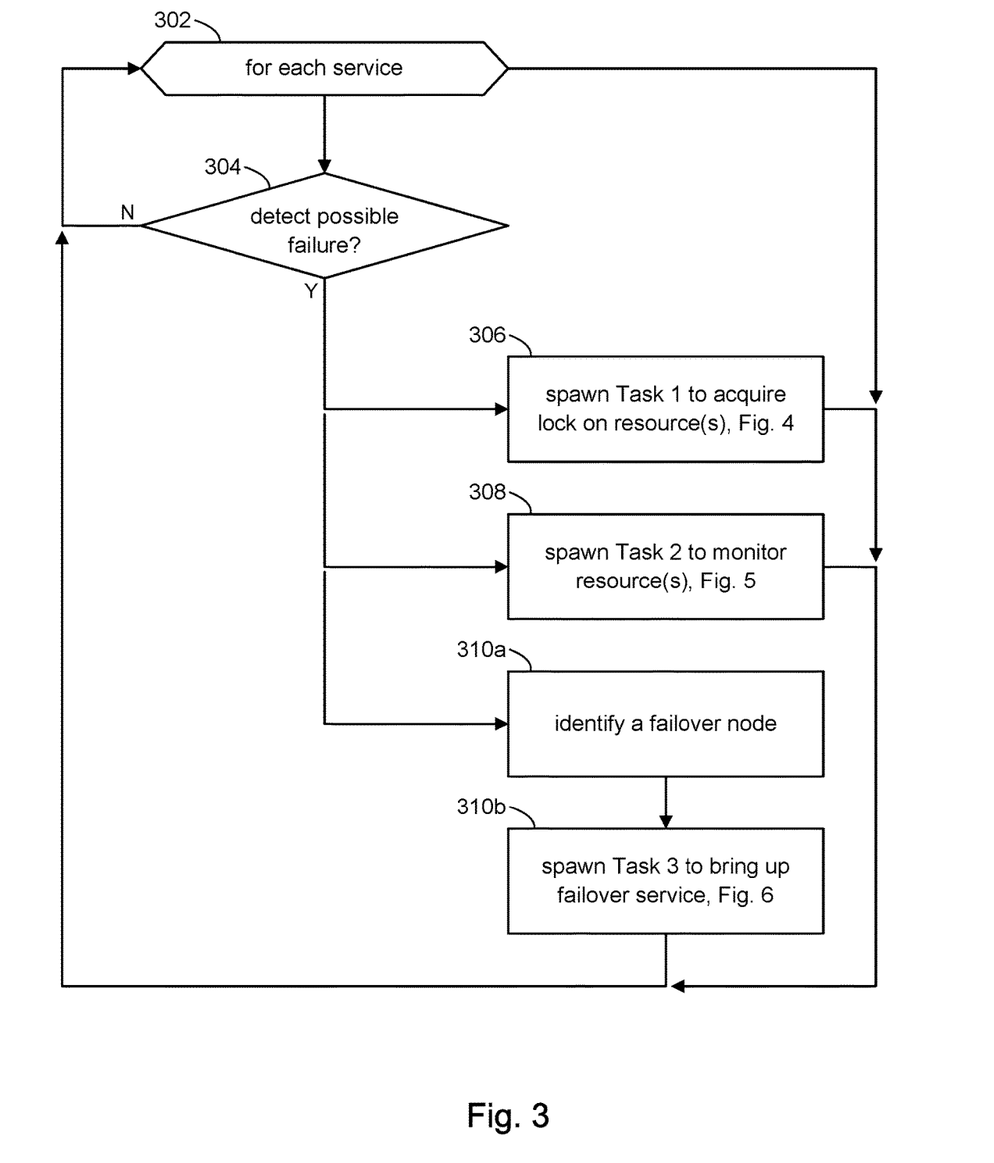
FIG. 3 is a simplified representation of an operational flow for monitoring services in a cluster in accordance with the present disclosure.

Referring to FIG. 3 and in conjunction with prior figures, the discussion will now turn to a high-level description of an operational flow in the cluster server 106 to perform failover processing in accordance with the present disclosure. In some embodiments, for example, the cluster server 106 can include computer executable program code, which when executed by a computing device (e.g., 202, FIG. 2), can cause the computing device to perform processing in accordance with FIG. 3. The operations shown in FIG. 3 can be performed in each node 122, in an embodiment where each node 122 monitors every other node 122 as mentioned above.

At block 302, the cluster server 106 can assess each service 124 in the cluster 102, one at a time. This cluster server 106 can repeat this loop after it has assessed each service 124, thus providing continual monitoring of the services 124 in cluster 102. The cluster server 106 can perform the following for each service 124:

At block 304, the cluster server 106 can make a determination whether there is an indication of a failure of service 124. For explanation purposes, consider an iteration in which the cluster service 106 monitors Service 1 to assess whether the service is up or down. In some embodiments, for example, the cluster server 106 can perform messaging directly with Service 1 itself to assess if Service 1 is up or not. In other embodiments, the cluster server 106 can ping Node 1 to assess whether Node 1, and hence Service 1 running on Node 1, is up or has crashed.

If the cluster service 106 receives a response (e.g., within a predetermined period of time) from Service 1 or from Node 1, this can be taken to mean that Service 1 is up and running. Accordingly, the cluster service 106 can return (via the N branch) to block 302 continue monitoring the next service (e.g., Service 2) in the cluster 102.

On the other hand, the absence of a response to the message sent directly to Service 1 can serve as an indication of a failure in Service 1. Likewise, the absence of a response to the ping to Node 1 can serve as indication that Node 1 is down, in which case Service 1 is also down. In either case, the lack of a response can represent an indication of a possible failure in Service 1; "possible" because Service 1 can actually be up and the lack of response may be due to some delay in communication between Node 1 (or Service 1) and the cluster server 106. For example, Node 1 itself may be acting very slowly, or Service 1 may be slow to respond (because, for example, it is processing a compute bound request). The communication network 108 may be experiencing high latencies, and so on. Whatever the case may be, the lack of response at this point is deemed a possible failure of Service 1.

In response to the indication of a possible failure in the Service 1, the cluster server 106 can continue processing along the Y branch to begin failover processing in accordance with the present disclosure to replace the initial instance of Service 1 on Node 1 with a failover instance of Service 1. To accomplish this, the cluster server 106 can spawn three concurrently executing tasks: Task 1, Task 2, Task 3.

At block 306, the cluster server 106 can spawn Task 1, which can be a process or a thread that executes on the cluster server 106. Task 1 can attempt to acquire a lock on the resources (e.g., Rsrc-A) associated with the service identified at block 304, in this case Service 1. Processing by Task 1 is discussed in more detail below. Processing in cluster service 106 can return to block 302 for the next service in the cluster 102.

At block 308, the cluster server 106 can spawn Task 2, which can be a process or a thread that concurrently executes with Task 1 on the cluster server 106. Task 2 can monitor Rsrc-A in accordance with the present disclosure, and is discussed in more detail below. Processing in cluster service 106 can return to block 302 for the next service in the cluster 102.

At block 310a, the cluster server 106 can identify another node 122 in the cluster 102 on which to perform background failover processing of the service identified at block 304 in accordance with the present disclosure. This "failover" node can be selected based on any suitable criteria; e.g., processing load, processing capability, communication capability, predetermined list of failover nodes, and so on.

At block 310b, the cluster server 106 can initiate bringing up a failover instance of Service 1 on the identified node to replace the initial instance of Service 1 by signaling the failover node to spawn Task 3 on the failover node. Processing of Task 3 is discussed in more detail below. Processing in cluster service 106 can return to block 302 for the next service in the cluster 102.

In an embodiment where each node 122 monitors every other node 122, the operations in blocks 310a and 310b can be performed by the node 122 that detected the indication of a possible failure in Service 1. In some instances, the failover node can be the detecting node itself, and Task 3 can be a process or thread that executes concurrently with Task 1 and Task 2. Alternatively, the detecting node can identify a different node to act as the failover node.

Figure 4:
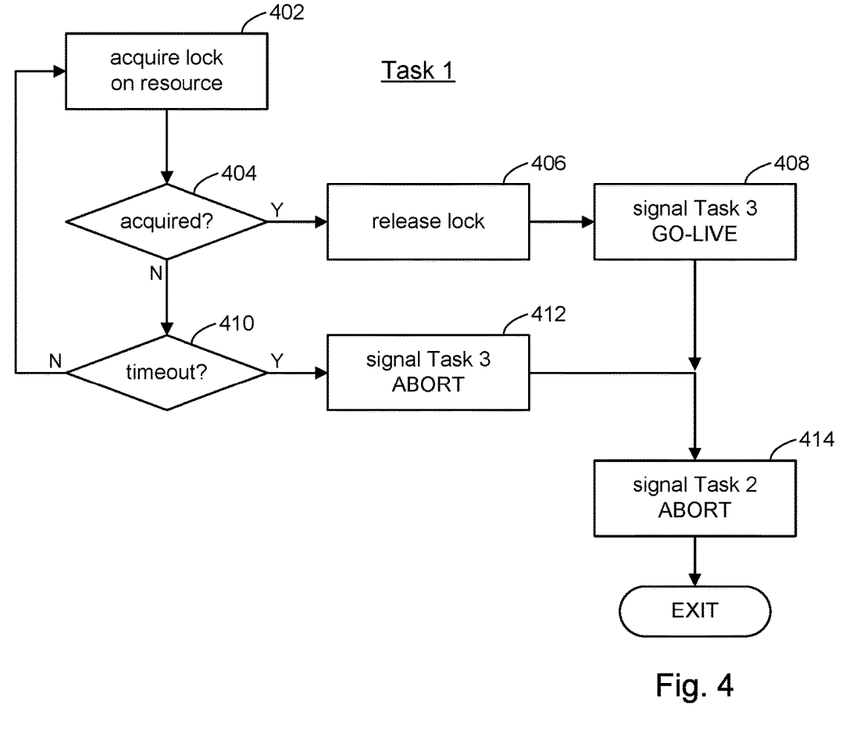
FIG. 4 is a simplified representation of an operational flow in a failover task in accordance with the present disclosure.

FIG. 4 in conjunction with prior figures shows an operational flow for Task 1 in accordance with the present disclosure. For example, the cluster server 106 can include computer executable program code, which when executed by a computing device (e.g., 202, FIG. 2), can cause the computing device to perform processing in accordance with FIG. 4. For explanation purposes, the example used in FIG. 4 will continue from the example introduced in FIG. 3, where the indication of a possible failure is in Service 1.

At block 402, Task 1 can attempt to acquire a lock on Rsrc-A by communicating a suitable request with the storage manager 144. Rsrc-A is initially locked by the initial instance of Service 1 running on Node 1. If Service 1 is up and running, then it will retain its lock on Rsrc-A. Conversely, if Service 1 has failed (died, crashed, etc.), then its heartbeats with the storage manager 144 will cease and the storage manager 144 will eventually release the lock on Rsrc-A.

At block 404, Task 1 can receive a positive response from the storage manager 144 indicating that the storage manager 144 has acquired the lock for Task 1. This result can be taken to mean that Service 1 in fact has failed. In response, processing in Task 1 can continue with block 406, discussed below.

At block 410, on the other hand, Task 1 can receive a negative response from the storage manager 144 indicating that the lock has not been acquired. A negative response, however, only means that the lock on Rsrc-A has not been released because (1) Service 1 is still up and maintains its lock on Rsrc-A, or (2) Service 1 in fact has failed and the storage manager 144 is holding the lock for the grace period described above, where the storage manager 144 waits several heartbeats and a graceful wait time before releasing the lock. Therefore, Task 1 may not be able to determine whether Service 1 is up or has failed based on a single attempt at acquiring a lock on Rsrc-A. Accordingly, Task 1 can continue processing at block 402 to retry acquiring the lock one or more times before timing out with a determination that Service 1 is in fact still up. Block 410 is discussed in more detail below.

Figure 6:
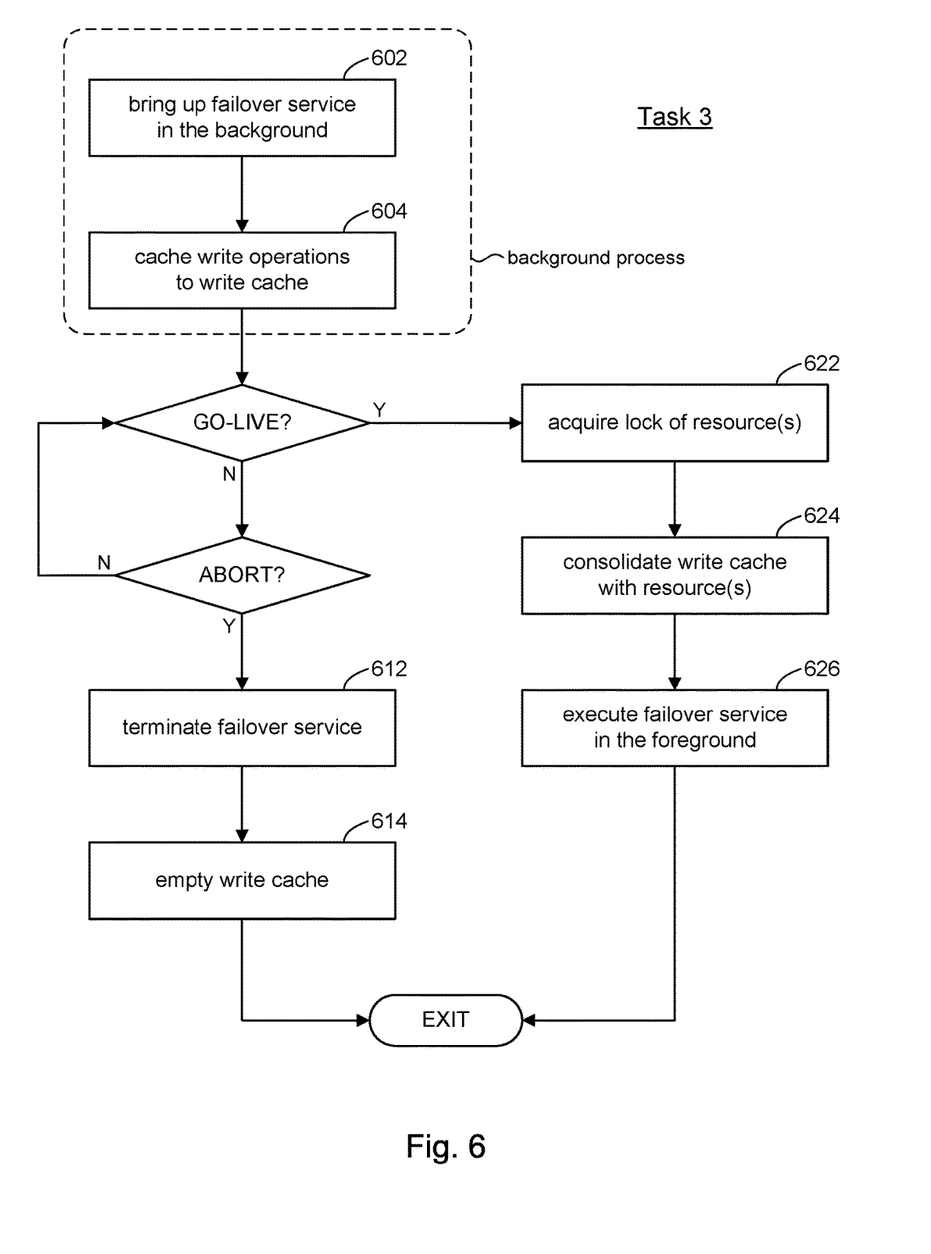
FIG. 6 is a simplified representation of an operational flow in yet a third failover task in accordance with the present disclosure.

At block 406, in response to a determination that Service 1 in fact has failed, Task 1 can release its lock on Rsrc-A. Note that acquisition of the lock by Task 1 (block 402) served only to detect whether Service 1 is up or has failed. Accordingly, Task 1 can release the lock on Rsrc-A and allow the failover instance of Service 1 to obtain the lock (FIG. 6).

At block 408, Task 1 can signal Task 3 to go live with the failover instance of Service 1. As will be explained below, Task 3 is responsible for bringing up the failover instance of Service 1.

Figure 5:
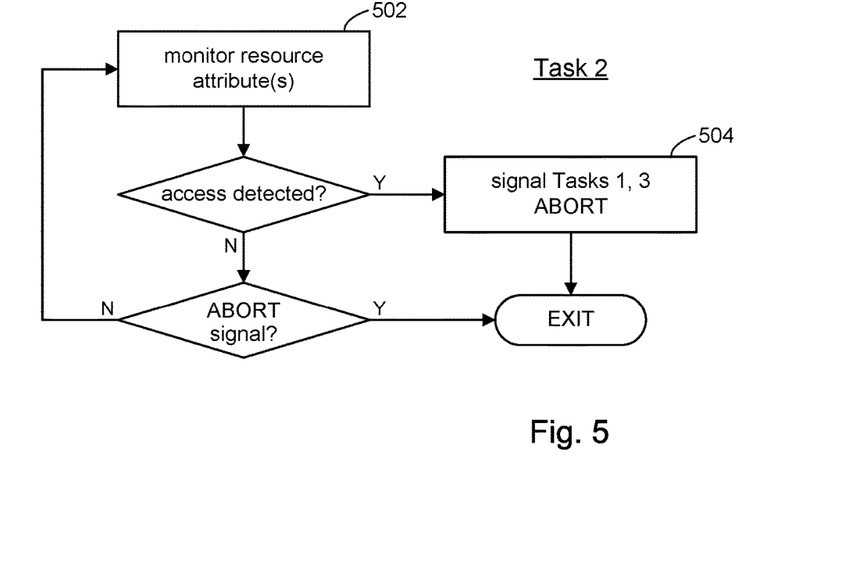
FIG. 5 is a simplified representation of an operational flow in another failover task in accordance with the present disclosure.

At block 414, Task 1 can signal Task 2 to abort, since at this point it is known that Service 1 in fact has failed, and the purpose of the monitoring provided by Task 2 is no longer needed (FIG. 5). Task 1 can then terminate, having determined that Service 1 is in fact down and signaled the failover instance of Service 1 to go live.

Returning to block 404, Task 1 can continue processing at block 410 in response to failing to acquiring a lock on Rsrc-A.

At block 410, Task 1 can determine whether a timeout has occurred before making a determination that Service 1 in fact is still up. The "timeout" can be expressed in terms of a predetermined number of attempts at acquiring a lock on Rsrc-A. For example, five failed attempts can mean that Service 1 is still up. In some embodiments, the timeout may be based on the expiration of a timer (e.g., set for tens of second to several minutes), and so on. A long timeout can avoid a false indication of a failed service. On the other hand, a short timeout can avoid a long delay in the case of an actual failure of the service.

At block 412, in response to Task 1 timing out before acquiring a lock in Rsrc-A, Task 1 can signal Task 3 to abort its failover service and signal Task 2 to abort monitoring Rsrc-A (block 414). This indicates the initial instance of Service 1 is in fact up, and Task 1 can terminate. Conversely, in response to Task 1 not timing out before acquiring a lock in Rsrc-A, processing by Task 1 can repeat with another attempt at acquiring a lock (block 402).

FIG. 5 in conjunction with prior figures shows an operational flow for Task 2 in accordance with the present disclosure. For example, the cluster server 106 can include computer executable program code, which when executed by a computing device (e.g., 202, FIG. 2), can cause the computing device to perform processing in accordance with FIG. 5. For explanation purposes, the example used in FIG. 5 will continue from the example introduced in FIG. 3, where the indication of a possible failure is in Service 1.

In accordance with the present disclosure, Task 2 can operate in a loop that monitors (block 502) one or more attributes of Rsrc-A to determine if Service 1 has accessed the resource. In some embodiments, for example, Task 2 can monitor attributes such as a "last modified" date, the size of Rsrc-A, a "last accessed" time, and so on. If an access to the monitored attribute is detected, that can mean Service 1 in fact is still up and running, and updating Rsrc-A in response to user requests. In response, Task 2 can signal (block 504) Task 1 and Task 3 to abort because the initial instance of Service 1 is up and so there is no need for failover processing, and Task 2 can terminate. On the other hand, if no access to the monitored attribute has been detected and Task 2 has not received an ABORT signal, then the monitor loop can be repeated.

It can be seen that in some instances, Task 2 can determine that Service 1 is alive sooner than Task 1 can determine that Service 1 is alive. This allows computer resources (e.g., the monitoring process of Task 1, the failover service of Task 3) to be freed up that much sooner by operation of Task 2 than by Task 1, thus improving processing performance in the respective computing devices on which Task 1 and Task 3 are executing.

FIG. 6 in conjunction with prior figures shows an operational flow for Task 3 in accordance with the present disclosure. Recall that Task 3 runs on a node selected by the cluster server 106 (block 310a, FIG. 3) as a failover node. In some embodiments, Task 3 can be a process that executes on the failover node. Thus, the failover node can include computer executable program code, which when executed by a computing device (e.g., 202, FIG. 2), can cause the computing device to perform processing in accordance with FIG. 6. For explanation purposes, the example used in FIG. 6 will continue from the example introduced in FIG. 3, where the indication of a possible failure is in Service 1.

At block 602, the failover node (via Task 3) can bring up a failover instance of Service 1 as a background process on the failover node. In particular, when the failover instance of Service 1 is executing as a background process, the server should not be visible to users, and so users should not be able to send service requests to the failover service. Service 1, at this point, can proceed to initialize itself in the background on the failover node.

At block 604, the failover node can cache write operations issued by the failover instance of Service 1. During the process of bringing up the service, the failover instance of Service 1 may perform one or more write operations on its resources, Rsrc-A. However, at this point in time, the initial instance of Service 1 running on Node 1 may still have a lock on Rsrc-A. In order not to delay the initialization of the failover instance of Service 1, the failover node can cache its write operations to a write cache.

After the failover node has initiated the failover instance of Service 1 in the background, the failover node can stay in a loop waiting for a GO-LIVE signal or an ABORT signal. Receiving a GO-LIVE signal means the cluster server 106 has determined that the initial instance of Service 1 on Node 1 in fact has failed (block 404). Conversely, receiving an ABORT signal means the cluster server 106 has determined that the initial instance of Service 1 in fact has not failed (block 410).

At block 612, in response to receiving an ABORT signal, the failover node can terminate the Service 1 background process, thus freeing up computer resources such as main memory and processing capacity in the failover node that would be otherwise tied up for Service 1. Since the failover service was operating in the background, terminating the service will have no detrimental effect on users since they never knew about the service in the first place.

At block 614, the failover node can empty the write cache. Since any write operations may by the failover instance of Service 1 were cached in the write cache and were not executed on Rsrc-A, terminating the service will not corrupt the resources. Task 3 can terminate.

At block 622, in response to receiving a GO-LIVE signal from cluster server 106 (block 408), the failover node (vis-è-vis the failover instance of Service 1) can acquire a lock on Rsrc-A; this can happen because the cluster server 106 released the lock (block 406) prior to signaling GO-LIVE.

At block 624, the failover node can consolidate the write cache with Rsrc-A. For example, each write operation can be executed on Rsrc-A, as if the failover instance of Service 1 had written to Rsrc-A.

At block 626, the failover node can cause the failover instance of Service 1 to execute as a foreground process. At this point failover to Service 1 on the failover node can be deemed complete. Service 1 is now visible to the users and can begin accepting and processing service requests from users. Task 3 can terminate.

With opportunistic failover as described, the delay for failing over to the failover service can be reduced in the case of an actual failure in the initial instance of the service. There is no extra burden in false alert cases. The only new cost is the resource usage for write caching (Task 3) and monitoring (Task 2). With the monitoring task (Task 2), false alerts can be identified faster so that the resource usage for caching and monitoring can be release as soon as possible.

Data consistency is ensured. The solution of the present disclosure still respects the exclusive lock on the resources held by the initial instance of the service while bringing up the failover instance of the service. Whether the failure indication (block 304) is an actual failure or not, there is no possibility for both instances of the service writing to the resources. In a true failure case, the write cache is established after monitoring the resources, and after the lock is acquired, the write cache is combined with resources. For false alerts, the write cache is discarded.

Data loss is prevented. If user sends data "A" to the service during possible failure:

In true failure case, data "A" cannot be received since the initial instance of the service is dead and the failover instance of the service cannot receive data. So user knows the correct status of their request, namely data "A" is not saved.

In false alert case, data "A" can be received by the initial instance of the service, and then saved to the resource. When Task 2 detects an access to the resource—this represents a false alert. Failover processing terminates the background instance and discards the write cache. So user knows the correct status of their request, namely data "A" is saved.

These and other variations, modifications, additions, and improvements may fall within the scope of the appended claims. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method for failover processing of a service in a cluster of nodes, including a first node and a second node, the method comprising:
   bringing up, by the first node, a failover instance of the service on the first node in response to an indication that an initial instance of the service on the second node may have failed;
   terminating, by the first node, the failover instance of the service in response to an indication that the initial instance of the service has not failed; and
   going live, by the first node, with the failover instance of the service in response to an indication that the initial instance of the service has failed.

2. The method of claim 1, wherein the indication that the initial instance of the service on the second node has not failed is based on monitoring for an access to resources used by the initial instance of the service or timing out while attempting to acquire a lock on the resources.

3. The method of claim 1, further comprising receiving, by the first node, a signal from a third node among the cluster of nodes to terminate the failover instance of the service in response to the third node detecting an access to resources used by the initial instance of the service or timing out while attempting to acquire a lock on the resources.

4. The method of claim 1, wherein bringing up the failover instance of the service includes the first node executing the failover instance of the service as a background process such that users have no access to the failover instance of the service.

5. The method of claim 4, wherein going live with the failover instance of the service includes the first node:
   acquiring a lock on resources used by the initial instance of the service; and
   executing the failover instance of the service as a foreground process such that users have access to the failover instance of the service.

6. The method of claim 1, further comprising:
   generating, by the first node, one or more write operations that are directed to resources used by the initial instance of the service, while bringing up the failover instance of the service;
   caching, by the first node, the write operations to a write cache instead of executing the write operations on the resources, to maintain data consistency of the resources;
   emptying, by the first node, the write cache, in further response to the indication that the initial instance of the service has not failed; and
   consolidating, by the first node, the write cache with the resources as part of going live with the failover instance of the service, in response to the indication that the initial instance of the service has failed.

7. The method of claim 1, further comprising receiving, by the first node, a signal to initiate the failover instance of the service from a process that detected the indication that the initial instance of the service on the second node may have failed.

8. The method of claim 1, wherein the indication that the initial instance of the service on the second node has failed is based on being able to acquire a lock on resources used by the initial instance of the service.

9. The method of claim 8, further comprising receiving, by the first node, a signal to go live with the failover instance of the service in response to acquiring a lock on the resources.

10. A non-transitory computer-readable storage medium having stored thereon computer executable instructions, which when executed by a computing device of a first node among a cluster of nodes comprising the first node and a second node, cause the computing device to:
    bring up a failover instance of a service on the first node in response to an indication that an initial instance of the service on the second node may have failed;
    terminate the failover instance of the service in response to an indication that the initial instance of the service has not failed; and go live with the failover instance of the service in response to an indication that the initial instance of the service has failed.

11. The non-transitory computer-readable storage medium of claim 10, wherein the indication that the initial instance of the service on the second node has not failed is based on monitoring for an access to resources used by the initial instance of the service or timing out while attempting to acquire a lock on the resources.

12. The non-transitory computer-readable storage medium of claim 10, wherein the failover instance of the service executes as a background process such that users have no access to the failover instance of the service.

13. The non-transitory computer-readable storage medium of claim 12, wherein the computer executable instructions, which when executed by the computing device, further cause the computing device to go live with the failover instance of the service by:
acquiring a lock on resources used by the initial instance of the service; and
executing the failover instance of the service as a foreground process such that users have access to the failover instance of the service.

14. The non-transitory computer-readable storage medium of claim 10, wherein the computer executable instructions, which when executed by the computing device, further cause the computing device to:
generate one or more write operations that are directed to resources used by the initial instance of the service, while bringing up the failover instance of the service;
cache the write operations to a write cache instead of executing the write operations on the resources, to maintain data consistency of the resources;
empty the write cache, in further response to the indication that the initial instance of the service has not failed; and
consolidate the write cache with the resources as part of going live with the failover instance of the service, in response to the indication that the initial instance of the service has failed.

15. The non-transitory computer-readable storage medium of claim 10, wherein the indication that the initial instance of the service on the second node has failed is based on being able to acquire a lock on resources used by the initial instance of the service.

16. A computing node among a cluster of nodes comprising a first node and a second node, the computing node comprising:
one or more computer processors; and
a computer-readable storage medium comprising instructions for controlling the one or more computer processors to:
bring up a failover instance of a service on the first node in response to an indication that an initial instance of the service on the second node may have failed;
terminate the failover instance of the service, in response to an indication that the initial instance of the service has not failed; and
go live with the failover instance of the service, in response to an indication that the initial instance of the service has failed.

17. The computing node of claim 16, wherein the indication that the initial instance of the service on the second node has not failed is based on monitoring for an access to resources used by the initial instance of the service or timing out while attempting to acquire a lock on the resources.

18. The computing node of claim 16, wherein the failover instance of the service executes as a background process such that users have no access to the failover instance of the service.

19. The computing node of claim 16, wherein the computer-readable storage medium further comprises instructions for controlling the one or more computer processors to go live with the failover instance of the service by:
acquiring a lock on resources used by the initial instance of the service; and
executing the failover instance of the service as a foreground process such that users have access to the failover instance of the service.

20. The computing node of claim 16, wherein the computer-readable storage medium further comprises instructions for controlling the one or more computer processors to:
generate one or more write operations that are directed to resources used by the initial instance of the service, while bringing up the failover instance of the service;
cache the write operations to a write cache instead of executing the write operations on the resources;
empty the write cache, in further response to the indication that the initial instance of the service has not failed; and
consolidate the write cache with the resources as part of going live with the failover instance of the service, in response to the indication that the initial instance of the service has failed.

* * * * *